UNITED STATES PATENT OFFICE.

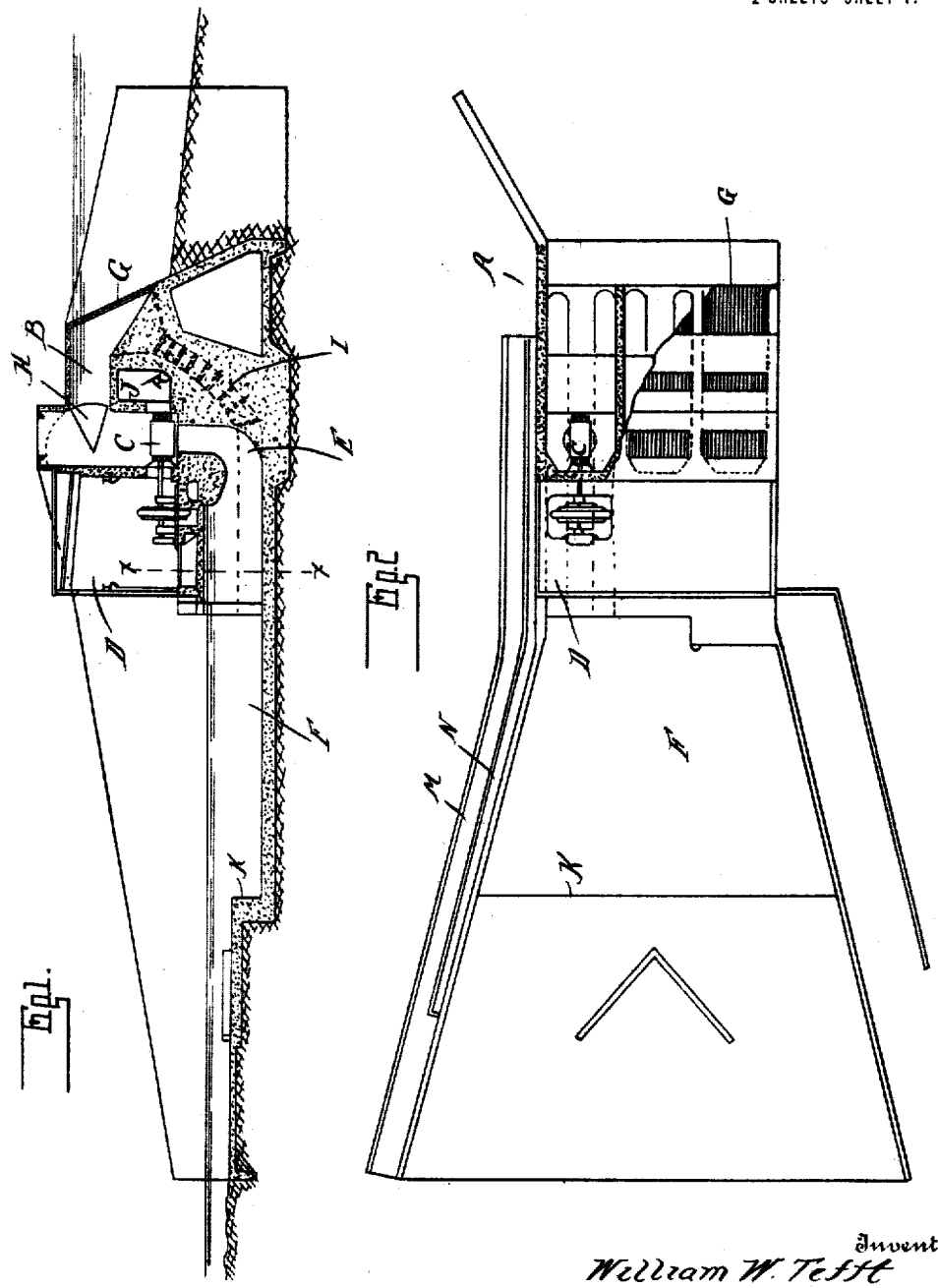

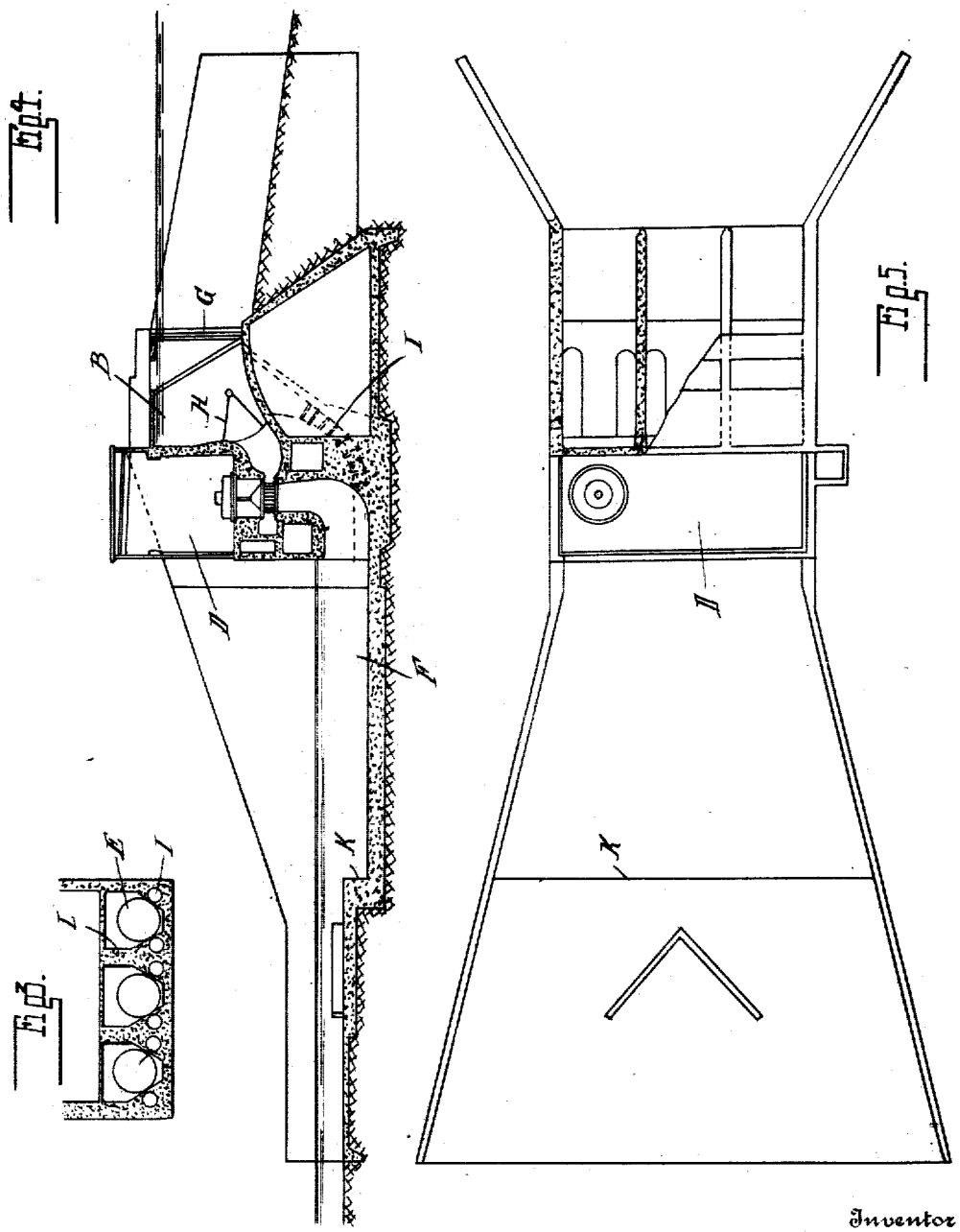

WILLIAM W. TEFFT, OF JACKSON, MICHIGAN.

HYDRAULIC POWER PLANT.

1,281,706.  Specification of Letters Patent.  Patented Oct. 15, 1918.

Application filed February 6, 1915. Serial No. 6,454.

*To all whom it may concern:*

Be it known that I, WILLIAM W. TEFFT, a citizen of the United States of America, residing at Jackson, in the county of Jackson and State of Michigan, have invented certain new and useful Improvements in Hydraulic Power Plants, of which the following is a specification, reference being had therein to the accompanying drawings.

The invention relates to hydraulic power plants, and the primary object of the invention is economy in construction. It is a further object to obtain greater efficiency, and to avoid destructive action upon the channel banks or any disturbance in the regulation of the power generators through variations of the water supply.

In the present state of the art, hydraulic power plants are usually constructed as a portion of the dam which retains the water-head. It is also usual to build adjacent to the power plant a spillway through which the surplus water is discharged. Both the power plant and the spillway involve expensive construction usually of concrete, while the remaining portions of the dam are less costly and can be constructed largely of earth work. In addition to the cost of the dam it has been found necessary to protect the river bed and banks from the erosive action of the discharged water. Particularly it is necessary to check the velocity of the spill-water, which necessitates the construction of a relatively long protecting channel, usually of concrete construction. Thus a very large factor is the cost of the work below the dam.

With my improved construction the cost is greatly reduced,—first, by dispensing with a spillway and disposing of the waste-water within the area occupied by the power plant, thereby reducing the width of the concrete portion of the dam; second, by discharging the waste-water beneath the surface of the water below the dam its velocity is quickly checked, so that a great deal of the expensive concrete construction may be dispensed with; and third, by arranging the discharge of the waste-water in certain relation to the draft tubes from the power plant, I produce in effect an increase in the water-head without disturbing the regulation of the power generators.

In the drawings:

Figure 1 is a vertical longitudinal section through my improved power plant;

Fig. 2 is a plan view thereof;

Fig. 3 is a cross section; and

Figs. 4 and 5 are views similar to views 1 and 2 showing a modified construction.

A is the portion of the dam upon which the power plant is constructed and which is usually of concrete construction; B is the penstock, from which the water is delivered to the turbine C; D is the generator room, and E the draft tubes through which the water from the turbines is discharged into the tail-race F; G are racks for preventing solid material from entering the penstock; and H are the controlling valves.

As has been stated, I dispense with the usual spillway and dispose of the waste water within the area of the power plant. It is, however, necessary to avoid: first, interference with other essential parts of the power plant; second, disturbance of the regulation of the generators; and third, destructive action of the liberated waste upon the river and channel banks. The first of these I obtain by conducting the waste-water downward through conduits I formed in the concrete structure, passing adjacent to but preferably independent of the draft tubes from the turbine. These conduits, together with the draft tubes, open into the tail-race or tumble-bay, while the upper end of the conduits is located adjacent to the bottom of the channel for the head-water and where protected by the racks G. Valves J are arranged to control the discharge through these waste-ways, which may be opened whenever it is desired to drain the heads or in times of flood, the passages being free and unobstructed when the valves are opened.

To avoid destructive action of the discharge water it is necessary to check its velocity, which, where the head is high, is very great. This I accomplish by constructing a tail-race or tumble-bay having a core or apron of concrete and containing a sufficient volume of water to absorb or check the velocity of the waste. This effect is aided by forming in said tail-race or tumble-bay an obstruction wall K, which is in direct line with the waste tubes and is below the surface of the water in the race. The effect of this obstruction is to check any current from the waste tubes which tends to cut its way through the water in the race, deflecting said current backward and distributing the force throughout a large water body to impart a substantially uniform velocity to all portions thereof.

Disturbance of the regulation of the power generators is avoided by discharging the waste-water as above described independent of the draft tubes from the turbines. This may be accomplished as shown in Fig. 3, by placing the conduits I in the division walls L, which separate the draft tubes from each other. These conduits I are also placed with their discharge ends lower than the discharge ends of the draft tubes, so that there will be a relatively large body of water above the same to check the velocity. No disturbance in the regulation is produced, as the waste-tubes do not directly enter the draft tubes, but the momentum imparted to the entire mass of water in the tail-race will cause its more rapid discharge, which has the effect of increasing the head.

As shown in Fig. 2, the tail-race is of a gradually flaring form, and by reason of the checking of the velocity the length of this race may be less than that required for a spillway. If desired, log chutes and fish chutes may be arranged at the side of the structure, as indicated at M and N, Fig. 2. My improved construction is also equally applicable to a horizontal and vertical type of turbine and generator, the horizontal construction being shown in Figs. 1 and 2, and the vertical in Figs. 4 and 5.

What I claim as my invention is:—

1. In a hydraulic power plant, the combination with a dam section provided with a penstock and draft-tube for a hydraulic turbine, of a tail-race, and means for passing the waste water freely and unobstructedly through said dam section and delivering the same below the surface of the water in said tail-race.

2. In a hydraulic power plant, the combination with a dam section provided with a penstock and draft-tube for the hydraulic turbine, of a tail-race adjacent to said dam section, and a free and unobstructed waste-way passing through said dam section, entering the same from below the surface of the headwater and discharging into said tail-race below the surface of the water therein.

3. In a hydraulic power plant, the combination with a dam section provided with a penstock and draft-tube for the hydraulic turbine, of means for passing the waste water through said dam section, entering the same from below the surface of the headwater, a tail-race into which the water from said waste-way and draft-tube is discharged below the surface of the tail-race water, and means within said tail-race for checking the velocity of the waste water and communicating the momentum thereof to the mass of water within the race.

4. In a hydraulic power plant, the combination with a dam section provided with a penstock, a draft-tube for a hydraulic turbine and a waste-way for the surplus water, of a tail-race into which the water from said draft-tube and waste-way are discharged below the surface of the tail-race water, having an apron, and means in said tail-race for checking the discharge from said waste way and communicating the momentum thereof to the mass of water within the race.

5. In a hydraulic power plant, the combination with a dam section provided with a penstock, a plurality of draft-tubes for the hydraulic turbines, of waste-ways passing through said section and discharging at a lower level than said draft-tubes, a tail-race into which the water from said draft-tubes and waste-ways is discharged, and means in the lower portion of said tail-race for deflecting the water discharged from said waste-ways, to communicate the momentum thereof more uniformly to the mass of water within the race.

6. In a hydraulic power plant, a dam section provided with a power-house having a hydraulic turbine therein, a penstock for supplying water to said turbine, a draft-tube for the water from said turbine passing beneath said power-house, and a free and unobstructed waste-way for the surplus water, also passing through said section and beneath said power-house.

7. In a hydraulic power plant, a dam section provided with a power-house having a hydraulic turbine therein, a penstock for supplying water to said turbine, a draft-tube for the water from said turbine passing beneath said power-house, a free and unobstructed waste-way for the surplus water passing through said section, entering the same from below the level of the headwater and also passing beneath the powerhouse independent of said draft-tube, and a common tail-race into which said draft-tube and waste-way discharge.

8. In a hydraulic power plant, a dam section provided with a power-house having a plurality of hydraulic turbines therein, separate draft-tubes for said turbines, and a free and unobstructed waste-way for the surplus water passing through said dam section beneath said power-house and between said draft-tubes.

9. In a hydraulic power plant, a dam section provided with a power-house and with water-ways for both the power and waste water, passing through said section and beneath the power-house, and valves separately controlling the power and waste water-ways accessible from the powerhouse, each waste-way being free and unobstructed when its valve is opened.

10. In a hydraulic power plant, the combination with a dam section provided with a penstock and draft-tube for the hydraulic turbine, of means for passing the waste-water through said dam section, entering the same from below the surface of the head-water, a tail-race into which the water from said waste-way and draft-tube is discharged below the surface of the tail-race water, and means for checking the velocity of the waste-water and communicating the momentum thereof to the mass of water within the tail-race.

In testimony whereof I affix my signature in presence of two witnesses.

WILLIAM W. TEFFT.

Witnesses:
JAMES P. BARRY,
HENRI E. BOWMAN.

Copies of this patent may be obtained for five cents each, by addressing the "Commissioner of Patents, Washington, D. C."